United States Patent
Lochkovic et al.

[11] Patent Number: 5,457,762
[45] Date of Patent: Oct. 10, 1995

[54] FIBER OPTIC RIBBON

[75] Inventors: Greg A. Lochkovic, Newton; John R. Keesee, Hickory, both of N.C.

[73] Assignee: Siecor Corporation, Hickory, N.C.

[21] Appl. No.: 258,870

[22] Filed: Jun. 13, 1994

[51] Int. Cl.[6] ............................................. G02B 6/44
[52] U.S. Cl. ............................. 385/114; 385/128; 385/141
[58] Field of Search .................................... 385/100, 114, 385/123, 127, 128, 141

[56] References Cited

U.S. PATENT DOCUMENTS

| 4,690,503 | 9/1987 | Janssen et al. | 385/128 |
| 4,900,126 | 2/1990 | Jackson et al. | 385/114 |
| 4,953,945 | 9/1990 | Nishimura et al. | 385/114 |
| 5,042,907 | 8/1991 | Bell et al. | 385/123 |

OTHER PUBLICATIONS

DSM Desotech Inc. publication "Cabelite™ 3287-9-26 Development Cabling Matrix Material", Undated, 4 pp.

*Primary Examiner*—John D. Lee
*Attorney, Agent, or Firm*—J. David Abernethy

[57] ABSTRACT

Disclosed is an optical fiber ribbon composed of a plurality of planar aligned optical fibers circumscribed by a plastic coating having a secant modulus of elasticity in the inclusive range of 150 to 300 MPa when measured at 2.5% strain as determined by the procedure described in ASTM:D638.91.

8 Claims, 2 Drawing Sheets

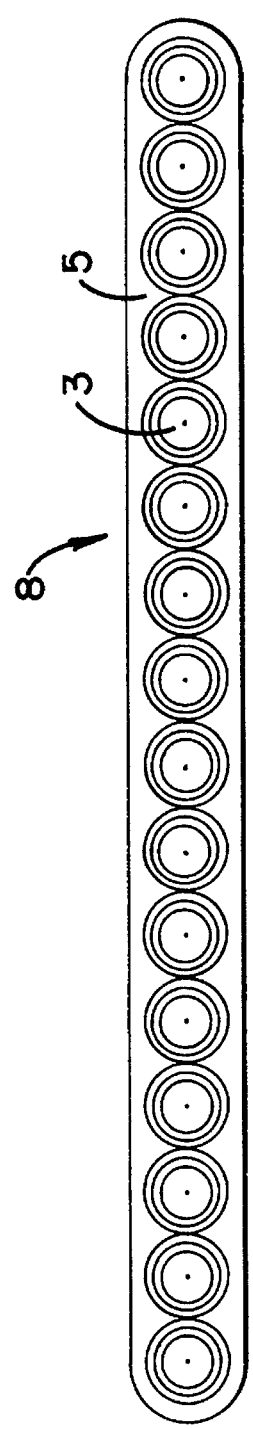
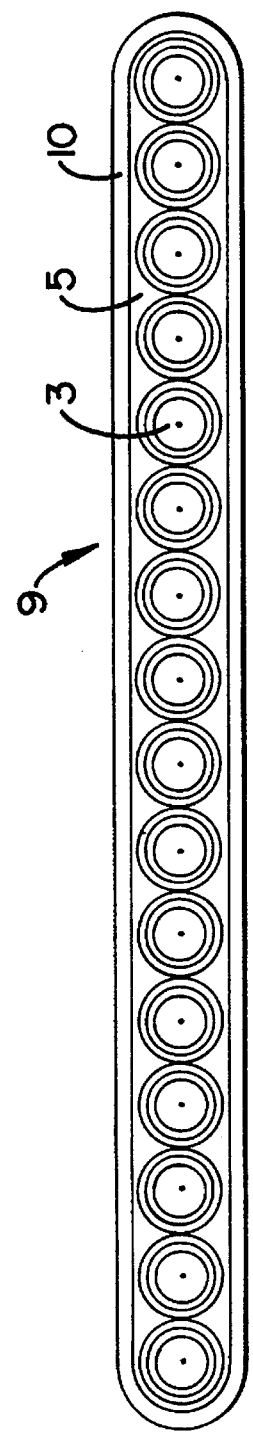

5,457,762

FIBER OPTIC RIBBON

FIELD OF THE INVENTION

The invention is an improved fiber optic ribbon the fibers of which have little or no attenuation change when compared to the attenuation of the individual fibers prior to and after they are aligned in a planar relationship with one another and are circumscribed with a plastic material to fix the aligned fibers into a ribbon like configuration.

DESCRIPTION OF THE PRIOR ART

Fiber optic ribbons are presently being made employing a plurality of optical fibers, each fiber having a circumscribing single or multi-layered coat of a polyacrylate resin. The fibers are aligned relative to one another in a planar relationship all of which are circumscribed by a plastic matrix applied to fix the optical fibers in their aligned planar relationship to one another to form a ribbon like composite. Each individual fiber, (for example fibers having a 180 μm diameter) prior to its being aligned, coated and fixed into a desired ribbon configuration, has a measurable attenuation, measured at a given wavelength (pre-manufacturing attenuation). Once such a fiber is processed along with others into a ribbon configuration, it has been noticed that there may be an attenuation change arising out of the manufacturing process, (post-manufacturing attenuation). In most cases where reduced diameter fiber is used (e.g., less than 245 μm in diameter), the difference between the post-manufacturing attenuation and the pre-manufacturing attenuation can be as high as 0.20 dB/km, measured at 1550 nm wavelength, the post-manufacturing attenuation being measured within one hour after completion of the manufacturing process. It is toward the solution of this problem, i.e., substantially no change between post- and pre-manufacturing attenuation values that this invention is directed.

SUMMARY OF THE INVENTION

The invention is a fiber optic ribbon made substantially in the same manner and having the same structure as prior art fiber optic ribbons with one important distinction: the plastic material circumscribing the planar aligned optical fibers is a plastic matrix having a secant modulus in the inclusive range of 150 MPa (Mega Pascals) to 300 MPa measured at a 2.5% strain. Procedures for measuring the secant modulus of elasticity are set forth in ASTM:D 638-91, "Standard Test for Tensile Properties of Plastics," which is incorporated by reference. Fiber optic ribbons made employing optical fibers and a plastic matrix having the requisite secant modulus of elasticity as above described, measured for post-manufacturing attenuation loss within one hour after manufacture, had a loss that was essentially equal to that of the pre-manufacturing attenuation loss, i.e., there was no measurable additional attenuation induced into the optical fibers by the manufacturing process.

It has been found that the difference between post- and pre-manufacturing attenuation is more observable in what is called reduced diameter fiber, typically less than 245 μm. It appears that sensitivity to such manufacturing induced attenuation increases as fiber diameter is reduced, i.e., it is typical for a 180 μm diameter fiber to be more sensitive than a 200 μm diameter fiber. Typically, ribbons made with 245 μm and greater fiber typically do not show any manufacturing induced attenuation when a plastic matrix was employed that did not have a secant modulus of elasticity within the inclusive range of 150 to 300 MPa measured at a strain of 2.5%. There are occasions where a small number of 245μm and larger fibers do exhibit manufacturing attenuation. In such cases, the use of a plastic matrix having a secant modulus as above specified yields ribbons that have essentially no manufacturing attenuation measured within one hour subsequent to manufacture. It is speculated that some fibers of 245 μm and greater exhibit manufacturing attenuation which may arise out of normal manufacturing procedures or variances in materials of fiber, ribbon and cable manufacturing. The invention includes the use of a plastic matrix that has a secant modulus of elasticity in the inclusive range of 150 MPa to 300 MPa measured at 2.5% strain for all diameters of optical fibers, so as to provide a safety factor in the event that same 245 μm or larger fibers behave as above speculated.

BRIEF DESCRIPTION OF THE DRAWINGS

FIG. 5 is a cross sectional view of a species of fiber optic ribbon known as thick-encapsulated ribbon employing the cross-linked matrix material 5 of FIG. 2.

FIG. 6 is a cross sectional view of a species of fiber optic ribbon known as multi-layered ribbon employing the cross-linked matrix material 5 of FIG. 2.

DETAILED DESCRIPTION OF THE INVENTION

Figure 1:
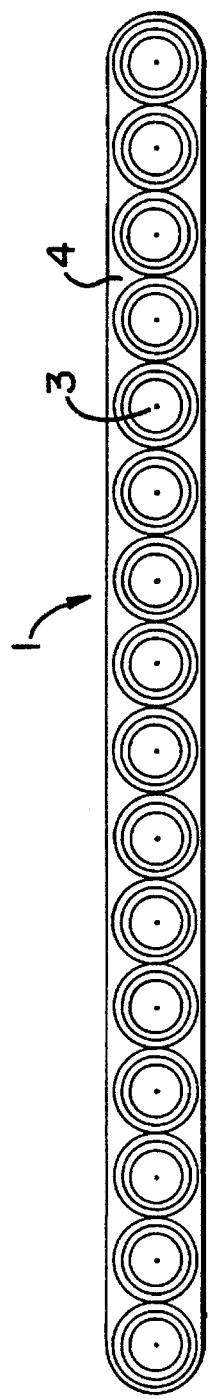
FIG. 1 is a cross sectional view of a prior art fiber optic ribbon.
Figure 2:
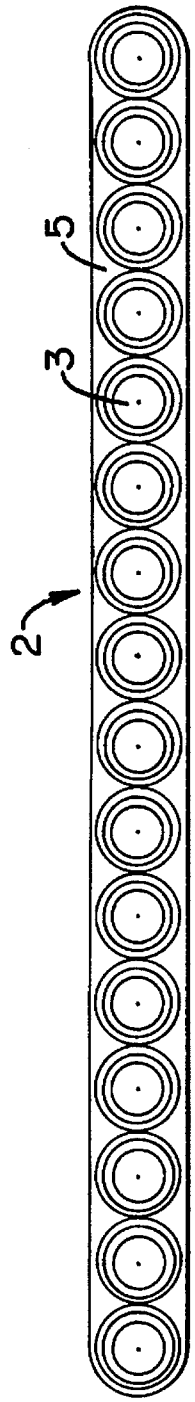
FIG. 2 is a cross sectional view of the invention employing cross-linked matrix material 5 which has a secant of modulus elasticity within the inclusive range of 150 MPa to 300 MPa measured at 2.5% strain according to ASTM:D638.91.
Figure 3:
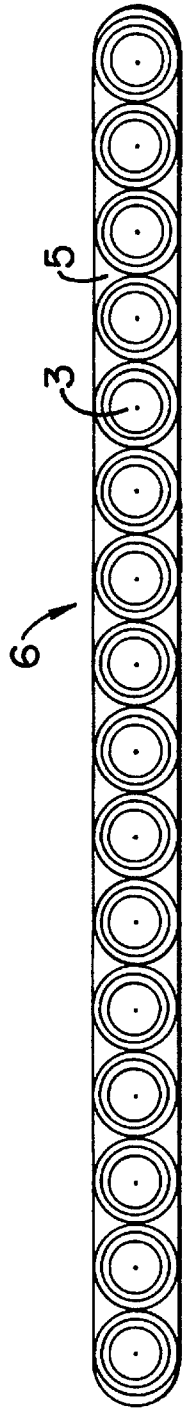
FIG. 3 is a cross sectional view of a species of fiber optic ribbon known as edge bonded ribbon employing the cross-linked matrix material 5 of FIG. 2.
Figure 4:
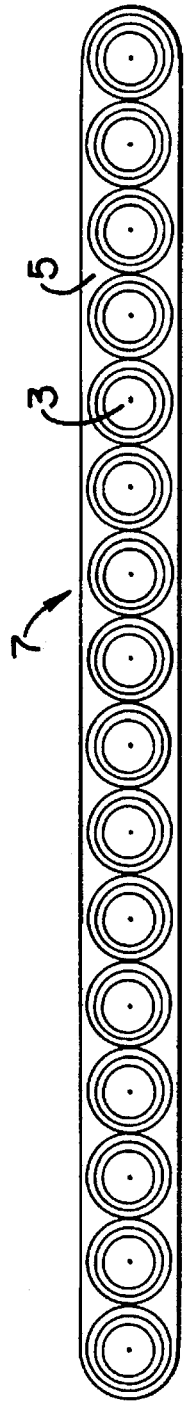
FIG. 4 is a cross sectional view of a species of fiber optic ribbon known as thin-encapsulated ribbon employing the cross-linked matrix material 5 of FIG. 2.

Referring to FIGS. 1 and 2, there is shown by element numbers 1 and 2 cross sectional views of a prior art and the invention respectively. It will be noted that the structure of the two optical fiber ribbons of 1 and 2 are essentially the same, namely a plurality of single or multi-layered (urethane acrylate) optical fibers 3, aligned relative to one another in a planar relationship, all circumscribed by a plastic material 4 and 5 respectively. Coated fibers 3 typically show manufacturing induced attenuation.

Unlike plastic coating 4 of FIG. 1, plastic coating 5 is a cross-linked plastic having a secant modulus in the inclusive range 150 MPa to 300 MPa, measured at 2.5% strain. Optical fiber ribbons made using such plastic material had post-manufacturing attenuation (measured one hour after manufacture) essentially equal to the pre-manufacturing attenuation, i.e., there was no measurable attenuation induced by the manufacturing process, regardless of the number of fibers employed.

Element numbers 6, 7, 8 and 9 identify various species of the invention. It will be noted that species 6, 7, 8 and 9 all have in common single or multi-layered plastic coated optical fibers 3, the same as previously described for like element numbers for FIG. 2, which are circumscribed by a cross-linked coating of matrix plastic material 5 having the requisite secant modulus of elasticity as above described. Whether or not the optical fibers are circumscribed by plastic matrix 5 having the requisite secant modulus of elasticity in the manner of edge-bonded ribbon 6, thin-encapsulated ribbon 7, thick-encapsulated ribbon 8 or multi-layer ribbon 9, the same results were obtained, i.e., no measurable difference between post- and pre-manufacturing attenuation. In the case of FIG. 6, the outer most layer of plastic, denoted by element number 10, may be a plastic that meets requisite modulus of elasticity requirement as above stated or it can have a secant of modulus of elasticity greater than 300 MPa measured at 2.5% strain, and/or it may have a secant of modulus of elasticity other than that of plastic coatings 5, i.e. other than between 150 and 300 MPa measured at 2.5% strain.

Manufacturing process steps and apparatus (not shown) used to manufacture the fiber optic ribbons of the invention are the same as used to make prior art fiber optic ribbons, namely a pay off reel loaded with fiber, a die (adapted to align the fibers into a planar configuration and apply a liquid plastic matrix to the optical fibers) connected to a chamber containing liquid cross-linkable plastic through which the aligned fibers are pulled and coated with the liquid cross-linkable plastic. Subsequently, the cross linkable plastic is cross-linked by exposure to ultra violet light. A take up reel onto which the finished ribbon product is wound can be used. A plastic coating wall thickness of 10 microns has been found to be sufficient; however, greater wall thickness provides enhanced buffering.

Examples of cross-linkable plastic material having the requisite secant modulus of elasticity are Matrix Coating 314-200-3 purchased from Borden, Inc., CableLite 3287-9-77 purchased from DSM Desotech and DIC FC 2424A purchased from DAINIPPON Chemical Inc. of Tokyo, Japan. Such cross-linkable plastic materials can be cross-linked by exposing the plastic to ultraviolet light in a manner well known to the plastic molding art. Single, dual and multi-layered plastic coated optical fibers, either single or multimode were purchased from Corning Incorporated. Alignment apparatus that may be used in the manufacture of the invention can be made by Nokia-Mallefer, Inc. of South Hadley, Mass. or Watson-Peachtree Fiber Optics of Patterson, N.J. Equipment used in determining secant modulus of elasticity as per the procedures set forth in ASTM:D 638-91 are Universal Tensile Tester purchased from Instron Corporation of Canton, MA and a Gardner Mechanical Drive (automatic draw-down apparatus) equipped with a Bird Type applicator to prepare cured films for testing purchased from Gardner, Inc. of Pompano Beach, Fla.

Induced manufacturing attenuation may not be observed with larger diameter fibers, i.e. 245μm and greater, employing a plastic matrix unlike the secant modulus of elasticity disclosed herein. However, by using a plastic having the requisite modulus of elasticity with such fibers, a safety factor is provided to protect larger diameter fibers (≧245 μm) from any non-typical sensitivity to induced manufacturing attenuation. Applicants have observed that such manufacturing attenuation is present in optical fibers (glass core plus two coats of urethane acrylate) having 200 and 180 μm diameters and would be expected in fibers having a diameter less than 180μm. The invention is particularly applicable with manufacturing sensitive fibers as disclosed.

It is to be further understood that wherever the diameter of an optical fiber is mentioned (in the specification and/or claims), such diameter includes the diameter of the glass portion plus up to two or more circumscribing plastic (urethane acrylate) coatings thereover. A variety of modifications which do not depart from the scope and spirit of the invention will be evident to persons of ordinary skill in the art from the disclosure herein. The following claims are intended to cover the specific embodiments set forth herein as well as such modifications, variations and equivalents.

We claim:

1. An optical fiber ribbon comprising:
   (a) a plurality of optical fibers aligned with one another in a planar relationship; and,
   (b) a first plastic coating substantially circumscribing said plurality of aligned optical fibers, said plastic coating having a secant modulus of elasticity in the range of 150 MPa to 300 MPa inclusive measured at 2.5% strain.

2. The optical fiber ribbon of claim 1 wherein said first plastic coating is a cross-linked plastic.

3. The optical fiber ribbon of claim 1 further including a second plastic coating circumscribing each optical fiber, said second plastic coating circumscribed by said first mentioned first plastic coating.

4. The optical fiber ribbon of claim 3 wherein said second plastic coating is a urethane acrylate polymer.

5. The optical fiber ribbon of claim 4 wherein the optical fibers each have an outermost urethane acrylate coating, said outermost urethane acrylate coatings of said optical fibers being in contact with the outermost urethane acrylate coatings of adjacent optical fibers.

6. The optical fiber ribbon of claim 1 further including another plastic coating circumscribing said first mentioned plastic coating having a secant modulus of elasticity other than the secant modulus of elasticity of the first mentioned plastic coating.

7. The optical fiber ribbon of claim 1 wherein each said optical fiber has an outer diameter of less than 245 μm.

8. An optical fiber ribbon comprising
   (a) a plurality of optical fibers aligned with one another in a planar relationship;
   (b) a first plastic coating substantially circumscribing said plurality of aligned optical fibers, said plastic coating having a secant modulus of elasticity in the range of 150 MPa to 300 MPa inclusive measured at 2.5% strain; and,
   (c) another plastic coating having a secant modulus of elasticity in the range of 150 to 300 MPa inclusive measured at 2.5% strain circumscribing said first plastic coating.

\* \* \* \* \*